United States Patent
Moustafa et al.

(10) Patent No.: US 11,560,443 B2
(45) Date of Patent: Jan. 24, 2023

(54) GRAFTED POLYVINYL ALCOHOL POLYMER, FORMULATIONS CONTAINING THE SAME, AND CREPING METHODS

(71) Applicant: Buckman Laboratories International, Inc., Memphis, TN (US)

(72) Inventors: Ahmed Moustafa, Germantown, TN (US); Daniel Glover, Brighton, TN (US)

(73) Assignee: BUCKMAN LABORATORIES INTERNATIONAL, INC., Memphis, TN (US)

( * ) Notice: Subject to any disclaimer, the term of this patent is extended or adjusted under 35 U.S.C. 154(b) by 174 days.

(21) Appl. No.: 17/010,858

(22) Filed: Sep. 3, 2020

(65) Prior Publication Data

US 2021/0070908 A1 Mar. 11, 2021

Related U.S. Application Data

(60) Provisional application No. 62/898,719, filed on Sep. 11, 2019.

(51) Int. Cl.
| | | |
|---|---|---|
| C08F 261/04 | (2006.01) | |
| B29C 41/26 | (2006.01) | |
| B29C 67/00 | (2017.01) | |
| B29C 69/02 | (2006.01) | |
| B29K 29/00 | (2006.01) | |

(52) U.S. Cl.
CPC ............ C08F 261/04 (2013.01); B29C 41/26 (2013.01); B29C 67/0011 (2013.01); B29C 69/02 (2013.01); *B29K 2029/04* (2013.01)

(58) Field of Classification Search
CPC ..... C08F 220/56; C08F 220/20; C08F 261/04
See application file for complete search history.

(56) References Cited

U.S. PATENT DOCUMENTS

| | | |
|---|---|---|
| 3,832,216 A | 8/1974 | Cressey, Jr. et al. |
| 3,903,035 A | 9/1975 | Affeldt et al. |
| 4,118,357 A | 10/1978 | Brabetz et al. |
| 4,233,362 A | 11/1980 | Novak et al. |
| 4,258,104 A | 3/1981 | Lee et al. |
| 4,514,552 A | 4/1985 | Shay et al. |
| 4,581,394 A * | 4/1986 | Yoshida ................ C08F 261/04 524/557 |
| 4,929,655 A | 5/1990 | Takeda et al. |
| 4,986,882 A | 1/1991 | Mackey et al. |
| 4,994,146 A | 2/1991 | Soerens |
| 5,023,309 A | 6/1991 | Kruse et al. |
| 5,935,880 A | 8/1999 | Wang et al. |
| 6,069,217 A | 5/2000 | Nae et al. |
| 6,183,599 B1 | 2/2001 | Oriaran et al. |
| 6,193,838 B1 | 2/2001 | Oriaran et al. |
| 6,239,228 B1 | 5/2001 | Zajaczkowski et al. |
| 6,287,418 B1 | 9/2001 | Schroeder et al. |
| 6,472,487 B2 | 10/2002 | Schroeder et al. |
| 6,500,536 B1 | 12/2002 | Yamada et al. |
| 6,689,250 B1 | 2/2004 | Luu et al. |
| 6,699,359 B1 | 3/2004 | Luu et al. |
| 6,846,383 B2 | 1/2005 | Tirimacco |
| 6,894,110 B2 | 5/2005 | Fong et al. |
| 6,991,707 B2 | 1/2006 | Hill, Jr. et al. |
| 7,850,823 B2 | 12/2010 | Chou et al. |
| 8,039,568 B2 | 10/2011 | Nguyen-Kim et al. |
| 8,101,045 B2 | 1/2012 | Furman et al. |
| 8,506,755 B2 | 8/2013 | Soerens et al. |
| 8,753,478 B2 | 6/2014 | Grigoriev et al. |
| 9,885,155 B2 | 2/2018 | Borkar et al. |
| 2002/0045703 A1 | 4/2002 | Bassett et al. |
| 2011/0247516 A1 | 10/2011 | Loccufier et al. |
| 2019/0161627 A1 | 5/2019 | Brennan et al. |
| 2020/0119356 A1 * | 4/2020 | Takei .................. H01M 4/364 |
| 2020/0140671 A1 * | 5/2020 | Moustafa ............. C08L 51/003 |

FOREIGN PATENT DOCUMENTS

| | | | | |
|---|---|---|---|---|
| CN | 104119480 A | * | 10/2014 | |
| CN | 104789041 A | | 7/2015 | |
| CN | 104119480 B | | 5/2017 | |
| EP | 144155 A | * | 6/1985 | .............. B41M 5/42 |
| EP | 0144155 A2 | | 6/1985 | |
| EP | 0587333 A2 | | 3/1994 | |
| EP | 0657478 A2 | | 6/1995 | |
| FR | 2774390 A1 | | 8/1999 | |
| JP | 5672006 A | | 6/1981 | |
| JP | 58206607 A | | 12/1983 | |
| JP | 59155408 A | | 9/1984 | |
| JP | 5143607 A | | 3/1986 | |
| JP | 08246388 A | * | 9/1996 | |
| WO | 9007529 A1 | | 7/1990 | |

(Continued)

OTHER PUBLICATIONS

Gonen et al. Journal of Polymer Science, vol. 19, 2215-2228 (Year: 1981).*

Wu et al., "Alkali-soluble resins (ASR) and acrylic blends: influence of ASR distribution on latex film and paint properties," Journal of Coatings Technology and Research, 2016, vol. 13, No. 4, pp. 655-665.

(Continued)

*Primary Examiner* — Mark S Kaucher
(74) *Attorney, Agent, or Firm* — Kilyk & Bowersox, P.L.L.C.

(57) ABSTRACT

A grafted polyvinyl alcohol polymer includes a polyvinyl alcohol main chain and a plurality of side chains grafted to the polyvinyl alcohol main chain. One or more of the side chains from the plurality of side chains include one or more units selected from: an aliphatic carboxylic acid, an aliphatic amide, an amino alkyl (meth)acrylate, a hydroxylated alkyl (meth)acrylate, or any combinations thereof. The grafted polyvinyl alcohol polymer can be included in a formulation that also includes water, and the formulation can be used as an adhesive in a creping process.

25 Claims, No Drawings

(56) References Cited

FOREIGN PATENT DOCUMENTS

WO          WO-0174599 A1 * 10/2001    ......... B41M 5/5245
WO          2020092479 A1     5/2020

OTHER PUBLICATIONS

Dundua et al., "Facile synthesis of tunable alkali soluble latexes," Polymer, 2014, vol. 55, pp. 3543-3550.

International Search Report and Written Opinion issued in corresponding International Patent Application No. PCT/US2020/049088 dated Dec. 8, 2020 (11 pages).

* cited by examiner

GRAFTED POLYVINYL ALCOHOL POLYMER, FORMULATIONS CONTAINING THE SAME, AND CREPING METHODS

This application claims the benefit under 35 U.S.C. § 119(e) of prior U.S. Provisional Patent Application No. 62/898,719 filed Sep. 11, 2019, which is incorporated in its entirety by reference herein.

The present invention relates to a grafted polyvinyl alcohol polymer and formulations that include the same, such as a creping adhesive formulation or a Yankee dryer coating composition. The present invention further relates to methods for creping that include such formulations and methods to impart tack and release characteristics and/or properties to the creped product. For purposes of the present invention, a reference to Yankee dryer includes rotary dryers in general for creping. A reference to Yankee coating, Yankee surface, and the like, includes rotary dryer coatings and surfaces.

BACKGROUND OF THE INVENTION

To form a thin paper web from a slurry of water and fiber, the wet web is dewatered, and then the dewatered web is at least partially dried. In the manufacture of tissue and similar paper products, creping is commonly used on such dewatered webs to impart desirable properties, such as softness and bulk. Creping is typically accomplished by conveying or carrying the web on a fabric to a heated rotary drum, sometimes referred to as a Yankee dryer. The web commonly is transferred to an adhesive dryer surface of the dryer and carried around a major circumferential portion of the dryer before the web reaches a zone of web de-contact from the drum. The de-contact zone is equipped with a creping blade against which the web abuts so as to be pushed backwardly or compacted upon itself in a machine direction of the web and attain the well-known tissue crepe paper structure, at which point the resulting creped web is removed from the dryer and collected, usually in rolled up form.

Before the web is transferred to the Yankee dryer, typically an adhesive composition, sometimes referred to as a "coating package" in the industry, is applied directly to the dryer surface of the dryer to form the adhesive dryer surface. The creping action typically requires some adhesion of the web to the outer surface of the dryer to effect a consistent and uniform creping action. Creping adhesives alone or in combination with release agents or other adjuvants have been applied either to the web or to the surface of the dryer in efforts to provide some balance of adhesion and release between the web and the dryer surface for purposes of drying and creping.

Various properties of the creping adhesive can be factors in the creping performance obtained. The level of adhesion of the creping adhesive to the drum dryer surface can be another factor which affects creping performance and results. Inadequate adhesion can result in poor creping, sheet floating, poor sheet handling, or other problems, whereas excessive adhesion may result in crepe blade picking, web plugging behind the crepe blade, web breaks due to excessive tension, or other problems.

Various types of creping adhesives have been used to adhere fibrous webs to rotary dryers such as Yankee dryers. Unmodified polyvinyl alcohols ("PVOH") are known and have been used as the adhesive in creping processes. While widely available and cost-effective, they tend to coat the dryer with a hard and uneven film that builds up as drying and creping proceed, resulting in uneven creping or other problems. Another disadvantage of unmodified PVOH is found in the handling of the PVOH at the mill, where PVOH is often obtained off-site and must be shipped to the mill. Due to its molecular weight and its ability to gel in aqueous solutions, the overall amount of PVOH in water tends to be low, e.g. 8 wt %. Thus, a "concentrated" or bulk amount of PVOH is actually a very low concentration of PVOH, which significantly increases the cost of shipping PVOH to a paper mill.

Another disadvantage of aqueous solutions of PVOH is the tendency of these aqueous solutions to increase in viscosity over time. Aqueous solutions of PVOH can reach viscosities as high as 2,000-100,000 cP·s based on solid content, the degree of hydrolysis, and molecular weight, leading to difficulties in handling the PVOH at the mill. Further, at some point (e.g. a few days to a few months, depending on the molecular weight and degree of hydrolysis of the PVOH), the aqueous solutions of PVOH can irreversibly turn into gels, rendering the PVOH essentially useless as an adhesive composition in the creping process.

Prior graft polymerizations performed with PVOH have mainly involved the graft polymerization of vinylic monomers such as vinyl acetate, vinyl pyrrolidone, ethylene, and vinyl esters. Some acrylic monomers have been included in the monomer mixture, but past graft polymerizations have seen a problem with graft-polymerizing acrylic monomers because the rate of polymerization in the presence of PVOH is too high, leading to very large particles and coagulation.

In view of the foregoing, improved PVOH compositions are needed that address the disadvantages discussed above. Particularly, it would be desirable to provide a formulation that can address the cost and handling disadvantages seen with unmodified PVOH. Further, it is desirable to have a PVOH that is more storage stable over time, reducing the waste associated with PVOH compositions that gel over time and form, irreversibly, highly viscous gels. The present invention provides these solutions including providing methods and formulations to better address these problems. It is further desirable to graft-polymerize acrylic monomers in the presence of a PVOH polymer to form novel grafted polyvinyl alcohol polymers.

SUMMARY OF THE PRESENT INVENTION

It is a feature of the present invention to provide an improved PVOH formulation. The improved PVOH formulation can be used in a paper mill in a cost-efficient manner.

Another feature of the present invention is to provide a PVOH-based adhesive that can be present in a water-based liquid at high concentrations.

A further feature of the present invention is to provide an improved PVOH formulation that is storage stable over long periods of time.

An additional feature of the present invention is to provide a PVOH based formulation that can become more dispersible at high pHs (e.g. a pH of 8, where an unmodified PVOH can form an irreversible gel).

A further feature of the present invention is to provide a PVOH based formulation that has low viscosity at various concentrations.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

One or more of the foregoing features have been accomplished in accordance with this invention by providing a grafted polyvinyl alcohol polymer of the present invention. The grafted polyvinyl alcohol polymer has or includes a polyvinyl alcohol main chain and a plurality of side chains grafted to the polyvinyl alcohol main chain. One or more of the side chains from the plurality of side chains have one or more units selected from: an aliphatic carboxylic acid, an aliphatic amide, a hydroxylated alkyl (meth)acrylate, and/or an alkyl amino (meth)acrylate, and/or any combinations thereof.

The present invention further relates to a formulation that includes an aqueous phase and the grafted polyvinyl alcohol polymer of the present invention. For instance, the formulation can be made up of 100 parts by weight of the aqueous phase and from 10 parts by weight to 40 parts by weight of the grafted polyvinyl alcohol polymer. The grafted polyvinyl alcohol polymer is dispersed in the aqueous phase.

The present invention further relates to a method of making an aqueous solution of a grafted polyvinyl alcohol polymer according to the present invention. The method can include a step of adding alkali to a dispersion, to thereby increase the pH of the dispersion to be from 4 to 8 or from above 5 to 8, and form an aqueous solution of the grafted polyvinyl alcohol polymer. In the method, the dispersion includes an aqueous phase and the grafted polyvinyl alcohol polymer, which is dispersed in the aqueous phase. The dispersion can have a pH of from 2 to 5 or from 2 to 3 prior to the adding step.

The present invention further relates to a process for creping a fiber web. The process can include a step of providing a rotating cylindrical dryer, including a dryer surface, and applying a formulation comprising the grafted polyvinyl alcohol polymer of the present invention to the dryer surface. In the process, a fiber web can be conveyed to the dryer surface. The fiber web can also be dried on the dryer surface to form a dried fiber web, and the dried fiber web can then be creped from the dryer surface.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to a grafted polyvinyl alcohol polymer and formulations containing the grafted polyvinyl alcohol polymer of the present invention. The formulations can be a creping adhesive formulation or Yankee dryer coating composition. The adhesive formulations can provide tack and release characteristics to a fiber web, when the fiber web is on the Yankee dryer or dryer surface. Unless otherwise indicated, a reference to "a polymer" or "the polymer" herein is a reference to the grafted polyvinyl alcohol polymer of the present invention.

"Monomer" (e.g., an aliphatic carboxylic acid, an aliphatic amide, an amino alkyl (meth)acrylate, a hydroxylated alkyl (meth)acrylate, or any combinations thereof) as used herein refers to a molecule that may be capable of reacting to form polymers by chemical union with monomers such as itself, or other monomers or monomeric units or a main chain.

"Monomeric unit" or "unit" (e.g. units of aliphatic carboxylic acid, etc. . . . ) as used herein refers to a chemically bound unit in a polymer that is derived from a monomer.

It is to be understood that while the monomers or units of monomers are described or referred to herein, the graft polymer itself has the radical version of each monomer and thus referred to as monomeric units or units of the monomer (e.g. units of an aliphatic carboxylic acid, an aliphatic amide, an amino alkyl (meth)acrylate, a hydroxylated alkyl (meth) acrylate, or any combinations thereof). Accordingly, the reactive functional group (or more reactive functional group) in each monomer described herein opens or reacts during the polymerization reaction (e.g. such as a vinyl group or hydroxyl group or carbonyl group). In such reactions, the terminal groups of the formed polymer remain. Thus, the polymer of the present invention has structural repeating units of the monomeric units described herein. The polymer or graft polymer can be considered a polymer derived from the monomers described herein along with the polyvinyl alcohol moiety as the main chain.

The grafted polyvinyl alcohol polymer of the present invention comprises, consists essentially of, consists of, includes, or is, a polyvinyl alcohol main chain and a plurality of side chains grafted to the polyvinyl alcohol main chain. One or more of the side chains from the plurality of side chains can comprise, consist essentially of, consist of, or include: one or more units selected from: an aliphatic carboxylic acid, an aliphatic amide, a hydroxylated alkyl (meth)acrylate, and/or an alkyl amino (meth)acrylate, or any combinations thereof.

As a point of explanation on the phrase "one or more of the side chains . . . ", this phrase refers to the fact that the grafted polyvinyl alcohol polymer of the present invention has side chains and all or some or one of the side chains can include, or be, the aliphatic carboxylic acid, the aliphatic amide, an alkyl amino (meth)acrylate, and/or the hydroxylated alkyl (meth)acrylate. Generally, a total percent of side chains that include, or is, the aliphatic carboxylic acid, the aliphatic amide, an alkyl amino (meth)acrylate, and/or the hydroxylated alkyl (meth)acrylate is at least 10% by number, or at least 25% by number, or at least 50% by number, or at least 75% by number, or at least 85% by number, or at least 95% by number, such as from 10% to 100%, from 30% to 100%, from 30% to 90%, from 30% to 80% or from 40% to 100% (all % by number). When a side chain is not, or does not, include the aliphatic carboxylic acid, the aliphatic amide, an alkyl amino (meth)acrylate, and/or the hydroxylated alkyl (meth)acrylate, the side chain can be either an acetate moiety or an alcohol moiety.

When the side chain does include or is the aliphatic carboxylic acid, the aliphatic amide, an alkyl amino (meth) acrylate, and/or the hydroxylated alkyl (meth)acrylate, it is to be understand that one, two, three or all four of these side chains can be present in a single side chain. Also, each side chain that includes, or is, the aliphatic carboxylic acid, the aliphatic amide, an alkyl amino (meth)acrylate, and/or the hydroxylated alkyl (meth)acrylate can be the same or different from other side chains. When a side chain includes the aliphatic carboxylic acid, the aliphatic amide, an alkyl amino (meth)acrylate, and/or the hydroxylated alkyl (meth)acrylate, that side chain can optionally contain one or more of the following substituents: hydroxypropyl methacrylate, vinyl acetate, N-vinyl pyrrolidone, 4-hydroxy butyl acrylate, 2-hydroxy ethyl acrylate, hydroxy propyl acrylate, hydroxy ethyl caprolactone acrylate, ethyldiglycol acrylate, stearyl polyethylene glycol methacrylate, N(3-aminopropyl)-2-propenamide, N-(3-aminopropyl) methacrylamide hydrochloride.

As an option, one or more of the side chains from the plurality of side chains comprise, consist essentially of, consist of, or include: units of the aliphatic carboxylic acid, units of the aliphatic amide, and units of the hydroxylated alkyl (meth)acrylate. As a further option, one or more of the side chains from the plurality of side chains comprise, consist essentially of, consist of, or include: units of the aliphatic carboxylic acid, units of the aliphatic amide, units of the alkyl amino (meth)acrylate, and units of the hydroxylated alkyl (meth)acrylate. In these examples of the grafted polyvinyl alcohol polymer of the present invention, at least one side chain has units of all three of the aliphatic carboxylic acid, the aliphatic amide, and the hydroxylated alkyl (meth)acrylate. The side chain itself can be considered a copolymer or terpolymer of these monomers.

As another option, one or more of the side chains from the plurality of side chains comprise, consist essentially of, consist of, or include: units of the aliphatic carboxylic acid; or units of the aliphatic amide; or units of the hydroxylated alkyl (meth)acrylate; or units of an alkyl amino (meth)acrylate. In these examples of the grafted polyvinyl alcohol polymer of the present invention, at least one side chain has units of only the aliphatic carboxylic acid, or only the aliphatic amide, or only the hydroxylated alkyl (meth)acrylate or only the alkyl amino (meth)acrylate. The side chain itself can be considered a homopolymer of the monomer used to make this side chain.

As another option, one or more of the side chains from the plurality of side chains can comprise, consist essentially of, consist of, or include: both units of the aliphatic carboxylic acid and units of the aliphatic amide. Alternatively, or in addition to the prior option, one or more of said side chains from the plurality of side chains can comprise, consist essentially of, consist of, or include: both units of the aliphatic carboxylic acid and units of the hydroxylated alkyl (meth)acrylate. Alternatively, or in addition to the prior options, one or more of said side chains from the plurality of side chains can comprise, consist essentially of, consist of, or include: both units of the aliphatic amide and units of the hydroxylated alkyl (meth)acrylate. Alternatively, or in addition to the prior options, one or more of said side chains from the plurality of side chains can comprise, consist essentially of, consist of, or include: both units of the aliphatic amide and units of the alkyl amino (meth)acrylate. Alternatively, or in addition to the prior options, one or more of said side chains from the plurality of side chains can comprise, consist essentially of, consist of, or include: both units of the alkyl amino (meth)acrylate and units of the hydroxylated alkyl (meth)acrylate. Alternatively, or in addition to the prior options, one or more of said side chains from the plurality of side chains can comprise, consist essentially of, consist of, or include: both units of the alkyl amino (meth)acrylate and units of the aliphatic carboxylic acid. In each of these examples of the grafted polyvinyl alcohol polymer of the present invention, at least one side chain has units of two of the aliphatic carboxylic acid, the aliphatic amide, the alkyl amino (meth)acrylate and the hydroxylated alkyl (meth)acrylate. The side chain itself can be considered a copolymer of the two monomers used to make this side chain.

The grafted polyvinyl alcohol polymer of the present invention can have a viscosity of less than 500 cP·s, when present in an aqueous solution having a pH of 3 to 5 (e.g. 3), at a concentration of 22.5 to 25 wt %, at 25° C. and 1 atmosphere. The viscosity can be less than 300 cP·s, less than 250 cP·s, less than 200 cP·s, less than 150 cP·s, or less than 100 cP·s. Viscosity is generally considered an intrinsic property, and thus, absent being in a superfluidic state, the aqueous solution of the polymer has a positive, non-zero viscosity value. Accordingly, a minimum value of these ranges can be 0.001 cP·s, or 0.005 cP·s, or 0.01 cP·s, or 0.1 cP·s.

Any viscometer (or viscosimeter) suitable for measuring a viscosity of a fluid can be used to measure the viscosity of the grafted polyvinyl alcohol polymer when in the aqueous solution.

The grafted polyvinyl alcohol polymer of the present invention is capable of being dispersed in an aqueous solution at a concentration of from 0.1 wt % to 40 wt % or higher, such as from 1 wt % to 40 wt %, or from 5 wt % to 40 wt % or from 10 wt % to 40 wt %. All values between 10 wt % and 40 wt % are included in this range, including the end points. For instance, the concentration of the polymer can be from 12 wt % to 38 wt %, or 15 wt % to 35 wt %, or 20 wt % to 30 wt %, or 25 wt % to 28 wt %. As used herein, weight percent is defined as the weight of solute divided by the weight of solution, where the quotient thereof is multiplied by 100%. For example, the solute would be the grafted polyvinyl alcohol polymer, and the solution would be the combined weight of the solute and the aqueous solvent.

The grafted polyvinyl alcohol polymer of the present invention is capable of being dispersed in an aqueous solution and forming a stable aqueous dispersion that does not exhibit coagulation or precipitation of the grafted polyvinyl alcohol polymer within a period of at least 6 months when stored at 25° C. and 1 atmosphere of pressure. Preferably, the stable aqueous dispersion does not exhibit coagulation or precipitation of the grafted polyvinyl alcohol polymer within a period of at least one year at 25° C. and 1 atmosphere of pressure, more preferably at least two years at these same conditions. As used herein, the term "coagulation" can mean an irreversible combination or aggregation of individual grafted polyvinyl alcohol polymers in the aqueous dispersion to form a clot or mass of several or multiple grafted polyvinyl alcohol polymers. As used herein, the term "precipitation" can mean a settling out of grafted polyvinyl alcohol polymer from the aqueous solution by gravity. The grafted polyvinyl alcohol polymer can be precipitated in the form of polymer particles coagulum.

The grafted polyvinyl alcohol polymer of the present invention is capable of being in condensed form when present in an aqueous solution having a pH of from about 2 to about 5 or from 2 to about 3 (e.g. 1.5 to 3.5, or 2 to 3.5, or 2.2 to 3, or 2.2 to 2.8, or 3 to 5, or 2 to 5, or 4 to 5, or 4 or 4.5 or 5), and is capable of being in semi-condensed form when present in an aqueous solution having a pH of from about 4 to about 5.5 (e.g. 3.8 to 5.8, or 4.0 to 5.5, or 4.2 to 5.2), and is capable of being in amorphous form when present in an aqueous solution having a pH of from about 5.5 to about 8 (e.g. 5.3 to 8.5, or 5.5 to 8.3, or 5.5 to 7.5, or 5.8 to 8, or 6.0 to 7.5). All values between the ranges of about 2 to about 5, about 2 to about 3, about 4 to about 5.5, and about 5.5. to about 8 are included in these ranges, including the end points of the individual ranges.

When the grafted polyvinyl alcohol polymer is in condensed form, individual polymers are folded upon themselves, resulting in a tangled grouping of individual polymers clumped together to form polymer particles. The folding of the individual grafted polyvinyl alcohol polymer occurs by intramolecular interactions between parts of individual polymers. These intramolecular interactions can be covalent or electrostatic interactions, the most common interaction being electrostatic interactions between parts of the individual polymers. For example, without wishing to be bound by a particular theory, amide units of the grafted polyvinyl alcohol polymer can interact, via electrostatic interaction, with vinyl alcohol units along the main chain of the polymer. In this example, the —$NH_2$ group of the amide units along the main chain of the polymer are protonated in the low pH environment. An example of an electrostatic interaction is van der Waals interaction.

When the grafted polyvinyl alcohol polymer is in condensed form, polymer particles can form in a water suspension. As an example, when the polymer is an aqueous dispersion having a pH of 2, the average particle size can be from 100 nm to 1,000 nm, from 100 nm to 200 nm, from 50 nm to 150 nm, and/or from 150 nm to 300 nm, with all values in this range being included, along with decimals of these values and fractions of these values. For instance, the average particle size can be about 170 nm. The particle size distribution can be multimodal, where, as an example the overall average particle size is 170 nm, where about 65% (by number) of the polymer particles having an average diameter of 470 nm and about 25% of the polymer particles having an average diameter of 50 microns. Particle sizes of the polymer can be determined via dynamic light scattering experiments.

When the grafted polyvinyl alcohol polymer is in semi-condensed form, the force of the intramolecular interactions weakens, relative to the force of these interactions in the condensed form, and individual grafted polyvinyl alcohol polymers begin to unfold. In this form, the force of the intramolecular interactions is high enough, however, to avoid complete unfolding of the individual grafted polyvinyl alcohol polymers, and, as a result, the polymer particles in condensed form swell so that the polymer particles in condensed form transition to larger sizes and the semi-condensed form. While most of the individual polymers swell in size, it is possible that some polymers remain in condensed form.

When the grafted polyvinyl alcohol polymer is in semi-condensed form, the larger, swelled polymer particles can form in solution. As an example, when the polymer is an aqueous solution having a pH of 4.5, the average particle size can be from 175 nm to 375 nm, with all values in this range being included, along with decimals of these values and fractions of these values. For instance, the average particle size can be about 300 nm. The particle size can be multimodal, where, as an example the overall average particle size is 300 nm, where about 95% (by number) of the polymer particles having an average diameter of 38 nm. Particle sizes of the polymer can be determined via dynamic light scattering experiments.

When the grafted polyvinyl alcohol polymer is in amorphous form, the force of the intramolecular interactions weakens sufficiently such that individual polymers unfold and are in a linear form or a substantially linear form. While most of the individual polymers unfold, it is possible that some polymers remain in condensed or semi-condensed form.

A condensed form is the least soluble form of the polymer in aqueous solution and an amorphous form is the most soluble form of the polymer in an aqueous solution compared to all three forms. The amorphous form can be present, and/or of higher population, and/or at higher pHs (pH basic conditions) and/or when the concentration of the grafted polyvinyl alcohol polymer of the present invention is low enough in an aqueous solution (for instance 0.1 wt % to 5 wt %).

When in an aqueous solution, the grafted polyvinyl alcohol polymer of the present invention can exhibit reversible dispersibility or reversible solubility in the aqueous solution. The ability to become more dispersed or more soluble and the ability to become less dispersed or less soluble can be achieved by altering the pH of the solution that has the grafted polyvinyl alcohol polymer of the present invention. For instance, an aqueous solution having the grafted polyvinyl alcohol polymer of the present invention in condensed form can have a pH of from about 2 to about 5 or from about 2 to about 3, and, at this pH, the grafted polyvinyl alcohol polymer of the present invention can exhibit low dispersibility or low solubility in the aqueous solution. Upon raising the pH of the aqueous solution to a pH of from about 5.5 to about 8 by adding an alkali to the aqueous solution, the grafted polyvinyl alcohol polymer of the present invention can transition to the amorphously-dissolved form and exhibit increased dispersibility or solubility in the aqueous solution. Thereafter, the pH of the aqueous solution can be reversibly-lowered to, e.g., to from about 2 to about 5 or to from about 2 to about 3, and the grafted polyvinyl alcohol polymer of the present invention can return to the condensed form. Upon returning to the condensed form, the grafted polyvinyl alcohol polymer of the present invention can, once again, exhibit low dispersibility or solubility in the aqueous solution. The pH is lowered by adding an acid to the aqueous solution having the grafted polyvinyl alcohol polymer of the present invention amorphously-dissolved or amorphous-dispersed therein.

The pH of the aqueous solution can be increased or decreased, step-wisely, or in a gradient of change, by step-wise adding of an allotment of alkali or an allotment of acid, respectively. The allotment of alkali or acid can be added, e.g., by a dropper that contains the alkali or acid. The alkali or acid are preferably aqueous solutions of the alkali or acid. The alkali can be any alkali described herein, and the acid can be, e.g., acetic acid, hydrochloric acid, hydrobromic acid, nitric acid, and sulphuric acid. The concentration of the alkali or acid is not particularly limited, so long as the alkali or acid can change the pH of the aqueous solution. The concentration can be, for example, from 0.01 molar to 5 molar, or from 0.05 molar to 3 molar, or from 0.1 to 1 molar, including any sub-value therebetween.

In the present invention, the aliphatic carboxylic acid can comprise, can consist essentially of, can consist of, can include, or is, acrylic acid and/or methacrylic acid. The aliphatic amide can be an unsaturated aliphatic amide. The aliphatic amide can be a saturated aliphatic amide. The aliphatic amide can comprise, can consist essentially of, can consist of, can include, or is, at least one of acrylamide, methacrylamide, dimethyl acrylamide, diethyl acrylamide, dipropyl acrylamide, and/or N-t-butylacrylamide. The hydroxylated alkyl (meth)acrylate can comprise, can consist essentially of, can consist of, can include, or is, 2-hydroxyethyl methacrylate, hydroxypropyl methacrylate, 4-hydroxy butyl acrylate, 2-hydroxy ethyl acrylate, hydroxy propyl acrylate, hydroxy ethyl caprolactone acrylate, ethyldiglycol acrylate, and/or hydroxy propyl methacrylate. Additional monomers in any or all of the side chains can include vinyl acetate, N-vinyl pyrrolidone, N(3-aminopropyl)-2-propenamide, N-3(aminopropyl) methacrylamide hydrochloride, and stearyl polyethylene glycol methacrylate.

In a more specific example, the aliphatic carboxylic acid is methacrylic acid; the aliphatic amide is acrylamide; and the hydroxylated alkyl (meth)acrylate is 2-hydroxyethyl methacrylate.

In a grafted polyvinyl alcohol polymer of the present invention, the grafted polyvinyl alcohol polymer can comprise, consist essentially of, consist of, or include, a structure (I):

In this structure the total weight percent of (a) units can be from 74 wt % to 95 wt % based on the total weight of the grafted polyvinyl alcohol polymer. All values between 74 wt % and 95 wt % are included in this range, with the end points included, and thus the range can be from 74 wt % to 90 wt %, 77 wt % to 92 wt %, 80 wt % to 95 wt %, 80 wt % to 92 wt %, 80 wt % to 90 wt %, 82 wt % to 95 wt %, 82 wt % to 92 wt %, or 82 wt % to 90 wt %. A total weight percent of (b) units is from 5 wt % to 26 wt % based on the total weight of the grafted polyvinyl alcohol polymer. All values between 5% and 26 wt % are included in this range, with the end points included, and thus the range can be from 5 wt % to 23 wt %, 5 wt % to 20 wt %, 8 wt % to 26 wt %, 8 wt % to 23 wt %, 8 wt % to 20 wt %, 10 wt % to 26 wt %, 10 wt % to 23 wt %, 10 wt % to 20 wt %, 12 wt % to 26 wt %, 12 wt % to 23 wt %, or 12 wt % to 20 wt %. The total weight percent of (a) and (b) units equals 100 weight percent. In structure (I), R is acetate or the side chain(s) from the plurality of side chains. Multiple units represented by structure (I) can be included in or part of the overall grafted polyvinyl alcohol polymer of the present invention. When more than one unit of structure (I) is present, a, b, and/or R, can be the same or different for each structure (I) present.

In the grafted polyvinyl alcohol polymer of the present invention, the grafted polyvinyl alcohol polymer can comprise, consist essentially of, consist of, include, or is, structure (II):

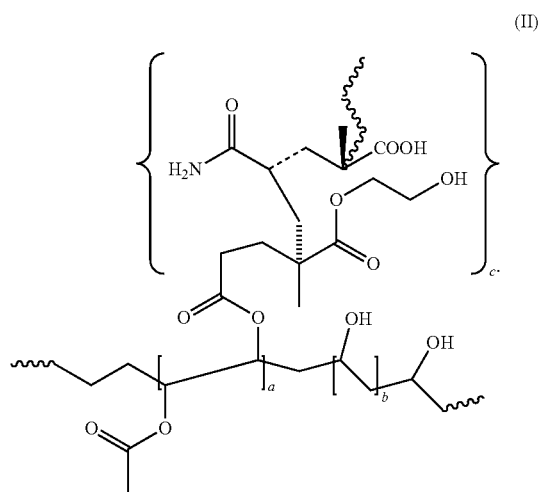

In this polymer, as relative amounts, a can be from 1 to 10; b can be from 35 to 55; and c can be from 35 to 55, based on a+b+c=100. All values within these ranges are included; thus, a can be any of 1, 2, 3, 4, 5, 6, 7, 8, 9, and 10; b can be any of 35, 36, 37, 38, 39, 40, 41, 42, 43, 44, 45, 46, 47, 48, 49, 50, 51, 52, 53, 54, and 55; and c can be any of 35, 36, 37, 38, 39, 40, 41, 42, 43, 44, 45, 46, 47, 48, 49, 50, 51, 52, 53, 54, and 55, based on a+b+c=100. Multiple units represented by structure (II) can be included in, or part of, the grafted polyvinyl alcohol polymer of the present invention. When more than one unit of structure (II) is present, a, b, and/or c can be the same or different for each structure (II) present.

The grafted polyvinyl alcohol polymer of the present invention can be one that exhibits, or has, one or more of the following properties: a) the grafted polyvinyl alcohol polymer is a latex; b) the grafted polyvinyl alcohol polymer is completely dispersible in water at an amount of from 1 wt % to 25 wt % at a pH of 2 to 5 or 2 to 3; c) the grafted polyvinyl alcohol polymer is not an irreversible gel at any pH; and/or d) the grafted polyvinyl alcohol polymer is gel-free at a pH of 8.

The grafted polyvinyl alcohol polymer of the present invention can exhibit one or more glass transition temperatures. For example, the grafted polyvinyl alcohol polymer has a first glass transition temperature of from −40° C. to 60° C. or from 40° C. to 60° C., and a second glass transition temperature of from 70° C. to 90° C. The glass transition temperature can be any value within these ranges. For instance, the first glass transition temperature can be −40° C. to 50° C., or from −40° C. to 40° C. or from −40° C. to 30° C. or from −40° C. to 20° C. or from −40° C. to 20° C. or from −30° C. to 60° C. or from −20° C.° to 60° C. or from −10° C. to 60° C. or from 0° C. to 60° C. or from 10° C. to 60° C. or from 20° C. to 60° C. or from 30° C. to 60° C. or 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C. or 60° C. The second glass transition temperature can be 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., or 90° C. These numbers can serve as minima or maxima for sub-ranges with the broader ranges.

Without wishing to be bound by a particular theory, the first glass transition temperature is the glass transition temperature for one or more side chains grafted to the polyvinyl alcohol main chain, and the second glass transition temperature is the glass transition temperature for the polyvinyl alcohol main chain. Any method and/or technique suitable for measuring glass transition temperature can be used to measure the glass transition temperature of the grafted polyvinyl alcohol polymer of the present invention. As an example, the glass transition temperature(s) can be measured with a dynamic mechanical thermal analysis rheometer.

Other properties of the grafted polyvinyl alcohol polymer of the present invention include the weight-average molecular weight and the number-average molecular weight of the grafted polyvinyl alcohol polymer. For instance, the grafted polyvinyl alcohol polymer of the present invention can have a weight-average molecular weight of from about 50,000 Daltons to about 1,500,000 Daltons, such as from 100,000 Daltons to 1,000,000 Daltons, or from 250,000 Daltons to 750,000 Daltons. The grafted polyvinyl alcohol polymer of the present invention can have a number-average molecular weight of from 2,000 Daltons to about 50,000 Daltons. The weight-average molecular weight and the number-average molecular weight of the grafted polyvinyl alcohol polymer can be measured by gel permeation chromatography.

The polydispersity of a polymer is generally defined as the weight-average molecular weight of a polymer divided by the number-average molecular weight of the polymer (PD=Mw/Mn). The grafted polyvinyl alcohol polymer of the present invention can have a polydispersity, Mw/Mn, of at least 1.5.

As indicated by the two glass transition temperatures in one exemplary grafted polyvinyl alcohol of the present invention, the main chain of the polymer can have properties characteristic of the main chain itself when in free, unreacted form. For example, prior to a grafting of monomers onto the main chain, the polyvinyl alcohol main chain, in unreacted form, can have a molecular weight distribution of from about 5,000 Daltons to about 1,000,000 Daltons. In this example, the molecular weight distribution of the polyvinyl alcohol main chain, in free, unreacted form, is a monomodal, bimodal, or multimodal, molecular weight distribution. The polyvinyl alcohol main chain, in free, unreacted form, can have a weight-average molecular weight of from 2,000 Daltons to 500,000 Daltons, and/or can have a number-average molecular weight of from about 1,000 Daltons to about 50,000 Daltons. Accordingly, the polyvinyl alcohol main chain, in free, unreacted form, can have a polydispersity, Mw/Mn, of from 2 to 7.

Further, the polyvinyl alcohol main chain, in free, unreacted form, can have a degree of hydrolysis of from about 74 mol % to about 98 mol % or other amounts below or above this range. All values between 74 mol % and 98 wt % are included in this range, with the end points included, and thus the range can be from 74 mol % to 95 mol %, from 74 mol % to 90 mol %, from 74 mol % to 88 mol %, from 76 mol % to 95 mol %, from 76 mol % to 90 mol %, and from 76 mol % to 88 mol %. Since all values between 74 mol % and 98 wt % are included in this range, the degree of hydrolysis can be 74 mol %, 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, 95 mol %, 96 mol %, 97 mol %, and 98 mol %, with decimals and fractions thereof included.

The degree of hydrolysis can be an indicator as to how many free alcohol moieties (—OH) are present on the main chain of the polyvinyl alcohol main chain. The synthesis of polyvinyl alcohol first involves the polymerization of vinyl acetate, which forms polyvinyl acetate. Thereafter, acetate moieties (—O—(CO)—CH$_3$) are replaced with alcohol moieties via a hydrolysis reaction. Thus, as used herein, the "degree of hydrolysis" can refer to the mol % of acetate moieties that are replaced with alcohol moieties upon transesterification of the polyvinyl acetate. Thus, as an example, 74 mol % of acetate moieties are replaced with alcohol moieties for a polyvinyl alcohol main chain characterized by a degree of hydrolysis of 74 mol %.

The polyvinyl alcohol main chain, in unreacted form, can be one or more of POVAL' (Kurary Co., Ltd.) 5/88, 3/80 3/82, 3/85, 4/85, 4/88, 5/82, 6/88, 13/88, 3/88, 5/74, 5/88, 8/88, and RS2117, one or more of SELVOL' (Sekisui Specialty Chemicals America, LLC) 5002, 513, 518, 418, 425, 443, 203, 523, 205, and 540, and any combination thereof.

Another aspect or feature of the present invention relates to a formulation that can comprise, can consist of, can consist essentially of, can include, or is, an aqueous phase and the grafted polyvinyl alcohol polymer of the present invention. In one aspect, the formulation can comprise, can consist of, can consist essentially of, or can include, 100 parts by weight of the aqueous phase and from 1 part by weight to 40 parts by weight or more, such as from 10 parts by weight to 40 parts by weight of the grafted polyvinyl alcohol polymer of the present invention, where, in this formulation, the grafted polyvinyl alcohol polymer is dispersed in the aqueous phase. All values between 1 part by weight and 40 parts by weight are included in this range, with the end points included, and thus the range can be from 5 parts to 35 parts by weight, from 10 parts by weight to 35 parts by weight, from 10 parts by weight to 30 parts by weight, from 12 parts by weight to 40 parts by weight, from 12 parts by weight to 38 parts by weight, from 12 parts by weight to 35 parts by weight, from 14 parts by weight to 40 parts by weight, from 14 parts by weight to 35 parts by weight, from 15 parts by weight to 40 parts by weight, from 15 parts by weight to 38 parts by weight, and from 15 parts by weight to 35 parts by weight. Since all values between 1 part by weight and 40 parts by weight are included in this range, the parts by weight can be, for instance, 2 parts by weight, 5 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight, 21 parts by weight, 22 parts by weight, 23 parts by weight, 24 parts by weight, 25 parts by weight, 26 parts by weight, 27 parts by weight, 28 parts by weight, 29 parts by weight, 30 parts by weight, 31 parts by weight, 32 parts by weight, 33 parts by weight, 34 parts by weight, 35 parts by weight, 36 parts by weight, 37 parts by weight, 38 parts by weight, weight, 39 parts by weight, and 40 parts by weight, with decimals and fractions thereof included.

The formulation of the present invention can be a stable aqueous dispersion that does not exhibit coagulation or precipitation of the grafted polyvinyl alcohol polymer within a period of at least six months when stored at 25° C. and 1 atmosphere of pressure. Alternatively, the aqueous dispersion is stable for a period of at least one year, or for a period of at least two years, when stored at 25° C. and 1 atmosphere of pressure. The terms "coagulation" and "precipitation" here have the same definition as given above.

The formulation of the present invention can have a pH of from about 2 to about 5 or from about 2 to about 3, and, when the formation has this pH, the grafted polyvinyl alcohol polymer can be in condensed form as discussed above. As another option, the formulation of the present invention can have a pH of from about 4 to about 5.5, and, when the formation has this pH, the grafted polyvinyl alcohol polymer is in semi-condensed form as discussed above. As a further option, the formulation of the present invention can have a pH of from about 5.5 to about 8, and, when the formation has this pH, the grafted polyvinyl alcohol polymer is the amorphously-dissolved form as discussed above.

In a formulation of the present invention, the grafted polyvinyl alcohol polymer is soluble in the aqueous phase of the formulation in an amount of at least 10 g/100 g water. As an option, the maximum amount of the grafted polyvinyl alcohol polymer in the formulation of the present invention can be about 50 g/100 g water or higher. Other ranges within these limits possible, such as: from 10 g/100 g water to 45 g/100 g; from 12 g/100 g water to 45 g/100 g water; from 15 g/100 g water to 45 g/100 g water; from 15 g/100 g water to 40 g/100 g water; from 18 g/100 g water to 45 g/100 g water; from 18 g/100 g water to 40 g/100 g water; from 20 g/100 g water to 45 g/100 g water; from 20 g/100 g water to 40 g/100 g water. All numbers within these ranges are available, for example: 10, 11, 12, 13, 14, 15, 16, 17, 18, 19, 20, 21, 22, 23, 24, 25, 26 27, 28, 29, 30, 31, 32, 33, 34, 35, 36, 37, 38, 39, 40, 41, 42, 43, 44, 45, 46, 47, 48, 49, and 50, or decimals thereof or fractions thereof.

The formulation of the present invention, at these concentrations of polymer in water, can be a highly-concentrated product, which reduces bulk for shipping and storage. Since the grafted polyvinyl alcohol polymer is dispersible or soluble in the aqueous solution, without gelling or other viscosity issues, it is possible to have formulations having higher concentrations of the grafted polyvinyl alcohol polymer, especially compared to conventional polyvinyl alcohols. An end-user of the concentrated product, such as a paper company or other user, can dilute the concentrate to a desired solids content for the application, or can directly pump or otherwise transfer to a Yankee or rotary drum spray boom coating solution.

The formulation of the present invention can include, in addition to the aqueous phase and the grafted polyvinyl alcohol polymer, at least one plasticizer. The plasticizer can be at least one of glycerin, propylene glycol, 2-oxydipropyl dibenzoate, 3-dipropylene glycol dibenzoate, and 4-diethylene glycol dibenzoate. If present, the plasticizer can be present in an amount of from 1 to 15 wt %, relative to 100 weight percent of the dispersion. For example, if glycerin is present, it can be present in an amount of from 1 to 15 wt %, relative to 100 wt % of the dispersion. If 2-oxydipropyl dibenzoate, it can be present in an amount of from 1 to 5 wt %, relative to 100 wt % of the dispersion. If 3-dipropylene glycol dibenzoate is present, it can be present in an amount of from 1 to 5 wt %, relative to 100 wt % of the dispersion. If 4-diethylene glycol dibenzoate is present, it can be present in an amount of from 1 to 5 wt %, relative to 100 wt % of the dispersion. If propylene glycol is present, it can be present in an amount of from 1 to 5 wt %, relative to 100 wt % of the dispersion.

The formulation of the present invention can include, in addition to the aqueous phase and the grafted polyvinyl alcohol polymer, one or more surfactants or no surfactants. While surfactants are not needed in the formulations of the present invention, they can be present in any conventional amounts. Since surfactants are not necessary, the amount of surfactant can be less than 1 wt % of surfactant (e.g. 0 wt % to 0.9 wt %, 0.001 wt % to 0.5 wt % to 0.001 wt % to 0.1 wt %). The formulation of the present invention can be, or is, surfactant free. The surfactant, if present, can be at least one of a cationic surfactant, an anionic surfactant, and/or a non-ionic surfactant.

Examples of surfactants include, but are not limited to, cetyl trimethylammonium bromide, sodium lauryl sulphate, and/or a condensation product of alkylene oxides, such as ethylene oxide (EO), with a hydrophobic molecule. Examples of hydrophobic molecules include fatty alcohols, fatty acids, fatty acid esters, triglycerides, fatty amines, fatty amides, alkylphenols, polyhydric alcohols and their partial fatty acid esters. Other examples include polyalkylene oxide block copolymers, ethylenediamine tetra block copolymers of polyalkylene oxide, and alkyl polyglycosides. Examples include nonionic surfactants that are fatty alcohol ethoxylates where the alcohol is about C10 to C18 branched or linear, such as the SURFONIC L (Huntsman Corporation, Houston, Tex.) or TDA series, the NEODOL (Shell Chemical Company, Houston, Tex.) series and the TERGITOL series (Union Carbide Corporation, Danbury Conn.). Other examples of nonionic surfactants include alkylphenol ethoxylates, polyethylene glycol esters of long chain fatty acids, ethoxylated fatty amines, polymers containing ethylene oxide and propylene oxide blocks, and alkyl polyglycosides.

The surfactant, such as the polymeric surfactant, can have an average molecular weight (in Daltons) of from 1,000 to about 20,000, for instance, from about 2,000 to about 15,000, from about 3,000 to about 12,000, from about 5,000 to about 20,000, from about 10,000 to about 20,000, from about 12,000 to about 17,000, from about 13,500 to about 16,000, at least about 20,000, at least about 50,000, at least about 100,000, or at least about 500,000.

Another aspect of the present invention is a method of making the grafted polyvinyl alcohol polymer according to the present invention. The method can comprise, consist essentially of, consist of, include, or is, a step of polymerizing, via free-radical polymerization, at least one of an aliphatic carboxylic acid, an aliphatic amide, and/or a hydroxylated alkyl (meth)acrylate in the presence of a free polyvinyl alcohol.

The method can comprise, consist essentially of, consist of, include, or has, a step of adding or mixing together at least one of an aliphatic carboxylic acid, the aliphatic amide, the alkyl amino (meth)acrylate and the hydroxylated alkyl (meth)acrylate in an aqueous solution comprising, consisting essentially of, consisting of, or including, water and a polyvinyl alcohol polymer, to obtain an aqueous solution of monomers and free PVOH. The step of adding or mixing can take place for at least 15 minutes or more, e.g. from 15 minutes to two hours or more. The step of polymerizing is initiated by adding an initiator, such as ammonium persulphate, sodium bisulphite, hydrogen peroxide, and t-butyl hydroperoxide, to the aqueous solution of monomers and free PVOH.

As an alternative, the method can comprise, consist essentially of, consist of, include, or has, a step of step-wise or semi-continuous addition of monomers to a reactor at a temperature of from 35° C. to 80° C. The reactor can comprise the polyvinyl alcohol main chain, in unreacted form, prior to the step-wise or semi-continuous addition of monomers to the reactor. The temperature range can be, for example, from 40° C. to 70° C., and is preferably 65° C. The method can also comprise, consist essentially of, consist of, include, or have, a step of polymerizing by adding an initiator, such as ammonium persulphate, hydrogen peroxide, and t-butyl hydroperoxide, to the aqueous solution of monomers and free PVOH mixture. Sodium bisulphite can be included as part of the initiator, and, without wishing to be bound by a particular theory, it is believed that the sodium bisulphite can lower the dissociation temperature of any peroxide present in the initiator, thus reducing the energy costs associated with initiating polymerization.

The initiator can be added all at once and at the beginning of the polymerization, or can be added over time, such as dropwise and over a period of time. If added dropwise, the period of time for dropwise semi-continuous adding of the monomers can be from 15 minutes to five hours or more, from 30 minutes to three hours, or from 45 minutes to two hours.

Upon addition of the initiator, either in whole or in part, the aqueous solution of monomer and free PVOH can be considered a reactive solution, and graft-polymerization of the monomers can take place in the reactive solution. The temperature of the reactive solution during the polymerization can be from 30° C. to 100° C., e.g. from 30° C. to 85° C., with all numbers and values therein being included in this range.

The method can also comprise, consist essentially of, consist of, include, or has, a step of terminating the polymerization step. Polymerization termination can occur by adding hydroquinone to the reactive solution.

One interesting aspect of the present invention is that the graft-polymerization of the monomer in the present invention can be totally with acrylic monomers. Put another way, the graft-polymerization can be in the substantial or complete absence of vinylic monomers. With the present invention, the percent of acrylic monomers used in the graft-polymerization can be, for instance, 50% by number or more, such as from 50% by number to 100% by number, or 75% by number to 99% by number or from 85% by number to 98% by number, based on total number of grafting sites on the polyvinyl alcohol main chain. The vinylic monomers present can be zero or less than 5% or less than 3% or less than 1% or less than 0.5% or less than 0.1% by number, based on total number of graft sites on the polyvinyl alcohol main chain.

Another aspect of the present invention is a method of making an aqueous solution of the grafted polyvinyl alcohol polymer according to the present invention. The method can comprise, consist essentially of, consist of, include, or is, a step of adding alkali to a dispersion, to increase the pH of the dispersion to be from 4 to 8 (e.g., from above 5 to 8) and form an aqueous solution of the grafted polyvinyl alcohol polymer. In the method, the dispersion can comprise, consist essentially of, consist of, include, or is, an aqueous phase and the grafted polyvinyl alcohol polymer, which is dispersed in the aqueous phase. The dispersion can have a pH of from 2 to 5 or from 2 to 3 prior to the step of adding the alkali to the dispersion.

The alkali can be any compound or composition that has a basic pH and is capable of increasing the pH of the dispersion. Examples of the alkali include, but are not limited to, caustic materials, alkali materials (e.g., alkali metal materials, alkaline earth metal materials), and basic buffering materials, or any combinations thereof. The alkali can be inorganic or organic, or combinations or mixtures of these different types of alkali materials. The alkali can be, for example, an alkali metal hydroxide, an alkali metal oxide, an alkali metal phosphate, an alkali metal carbonate, an alkali metal bicarbonate, an alkaline earth hydroxide, an alkaline earth oxide, an alkaline earth phosphate, an alkaline earth carbonate, ammonium zirconium carbonate, organotitanate, organozirconate, ammonium hydroxide, ammonium carbonate, ammonium bicarbonate, alkali metal silicate, urea, substituted urea, a cyanate, an alkylamine, an alkanolamine, a quaternary ammonium salt, a salt of a weak acid and a strong base, an alkaline buffering solution, polyalkali metal pyrophosphates, or any combinations thereof. An example of an alkali metal hydroxide which may be used is NaOH. The alkali salts can be used as brines or in water-soluble salt forms. As an option, an alkaline buffering agent can be used in the adhesive base formulation to establish alkalinity and resist pH changes. Examples of alkaline buffers which can be used include, for example, magnesium oxide, and an aqueous solution of disodium phosphate and monosodium phosphate. Examples of alkanolamines include triethanolamine, diethanolamine, or monoethanolamine. The alkali can be, for example, an Arrhenius base (i.e., a substance that ionizes in water to produce hydroxide ions), a Bronsted-Lowry base (i.e., a substance that can accept a proton or hydrogen cation (W)), or a Lewis base (i.e., a species that donates an electron pair), provided its introduction can affect an increase in the pH of an adhesive base formulation.

The dosage rate of the alkali depends on factors of the level of pH increase sought, the base strength of the particular material, and the addition rate. As a non-limiting example, to increase the pH of the dispersion about 0.5 unit, a 10% by weight NaOH solution can be added in a wt:wt ratio (solids only basis) to the dispersion having an original pH in water of about 4.0 to about 6.0 in a range amount of about 1/30 to about 30/1, such as 1/10 or 10/1, or other range values. The magnitude of further increases in pH obtained by further increasing the amount of alkali added may be approximately proportional or at least may trend together.

As an alternative to adding alkali, the aqueous dispersion can be diluted with water to raise the pH. The transition from the condensed, to semi-condensed, to amorphously-dissolved form of the grafted polyvinyl alcohol polymer in the aqueous dispersion can take place while the water is being added to the low-pH aqueous dispersion.

The present invention further relates to a process of creping that includes the use of the formulation of the present invention as a creping adhesive. For instance, the process for creping a fiber web can comprise providing a rotating cylindrical dryer or similar roller, including a dryer surface. An adhesive formulation comprising the formulation of the present invention is applied to the dryer surface, and a fiber web is conveyed to the dryer surface. The fiber web is dried on the dryer surface to form a dried fiber web, and the dried fiber web is creped from the dryer surface. As an option, the fiber web to be creped can be through-air dried before transfer to a Yankee dryer surface that has been pre-coated with the modified creping adhesive formulation.

As an option, the adhesive formulation is the dispersion as described herein. During the present process of creping, the formulation can have a pH of from about 4.5 to about 6, and the grafted polyvinyl alcohol polymer can be amorphously-dissolved in the dispersion. The formulation can have the grafted polyvinyl alcohol polymer present at a concentration of from 0.1 wt % to 5 wt %, such as from about 0.5 wt % to 3 wt % or other amounts, all based on total weight of the adhesive formulation.

The process of creping can also comprise, consist of, consist essentially of, or include, a step of substantially removing the formulation from the dryer surface of the creping. Prior to this substantial removing of the formulation from the drying surface, the pH of the formulation on said dryer surface can be raised to a pH above 6, which can facilitate removal of the formulation from the dryer surface.

The formulation can be applied to a Yankee dryer or other cylindrical dryer used in such a creping process. The formulation can be applied on a continuous basis, semi-continuous basis, intermittent basis, or a one-time basis to the cylindrical dryer surface prior to rotating, during rotation, or both. The formulation of the present invention can be applied to the surface of the cylindrical dryer (e.g., after the creping blade and before the web transfer location), to the fiber web prior to being applied onto the cylindrical dryer surface, or during application of the fiber web onto the cylindrical dryer surface, and/or after the fiber web application to the cylindrical dryer surface. The formulation can be applied by the use of one or more spray nozzles of a spray boom, a roll coater, an impregnation bath for the fiber web, or other coating device. The application rate or use rate of the adhesive formulation can be from 0.1 mg/m$^2$ of dryer surface to 40 mg/m$^2$ of dryer surface, such as from 0.1 mg/m$^2$ of dryer surface to 20 mg/m$^2$ of dryer surface, or from 0.1 mg/m$^2$ of dryer surface to 10 mg/m$^2$ of dryer surface, or from 1 mg/m$^2$ of dryer surface to 10 mg/m$^2$ of dryer surface, or from 5 mg/m$^2$ of dryer surface to 10 mg/m$^2$ of dryer surface, or other amounts.

Creping systems, methods, and adhesives are described in the following U.S. Pat. Nos. which are incorporated herein in their entireties by reference: U.S. Pat. Nos. 3,640,841; 4,304,625; 4,440,898; 4,788,243; 4,994,146; 5,025,046; 5,187,219; 5,326,434; 5,246,544; 5,370,773; 5,487,813; 5,490,903; 5,633,309; 5,660,687; 5,846,380; 4,300,981; 4,063,995; 4,501,640; 4,528,316; 4,886,579; 5,179,150; 5,234,547; 5,374,334; 5,382,323; 5,468,796; 5,902,862; 5,942,085; 5,944,954; 3,301,746; 3,879,257; 4,684,439; 3,926,716; 4,883,564; and 5,437,766.

The adhesive formulation of the present invention can be used in other applications of the paper industry or other industries. The adhesive formulation of the present invention can be considered biodegradable, and/or non-toxic, and/or contains one or more food-grade components.

The present invention will be further clarified by the following examples, which are intended to be exemplary of the present invention.

EXAMPLES

Example 1—Synthesis of Polymer 1

A resin was prepared by dissolving a polyvinyl alcohol polymer in water. Methacrylic acid, acrylamide, and 2-hydroxyethyl methacrylate were mixed in the PVOH aqueous solution for at least 30 minutes to form a precursor solution.

Batch polymerization was initiated by adding a solution of ammonium persulphate initiator to the precursor solution at 60° C., and polymerization proceeded at 80° C. for 2 hours. The ammonium persulphate was kept at constant feeding rate for 120 minutes at 80° C. Residual monomers were suppressed by t-butyl hydroperoxide and hydrogen peroxide at 40° C. for 30 minutes. Table 1 shows the reactants and relative amounts in this polymerization.

TABLE 1

Graft copolymerization recipe of Polymer 1.

| Chemical name | Function | CAS # | wt % |
|---|---|---|---|
| Water | Reaction Solvent | 7732-18-5 | 77.5 |
| Acrylamide | Monomer | 79-06-1 | 1.18 |
| Methacrylic acid | Monomer | 79-41-4 | 1.18 |
| 2-Hydroxy ethyl methacrylate | Monomer | 868-77-9 | 7.86 |
| PVOH K5/88 | Protective Colloid | 25213-24-5 | 11.8 |
| Sodium Bicarbonate | Buffer salt | 144-55-8 | 0.01 |
| Ammonium Persulphate | Initiator (Oxidizer) | 7727-54-0 | 0.1 |
| Sodium Bisuphite | Initiator (reducer) | 7631-90-5 | 0.01 |
| Hydrogen Peroxide | Initiator (Oxidizer) | 7722-84-1 | 0.09 |
| t-Butyl Hydroperoxide | Initiator (Oxidizer) | 75-91-2 | 0.08 |
| Total | | | 100 |

Polymer 1 was analyzed with gel permeation chromatography ("GPC"). A GPC trace was obtained, and, from this GPC trace, the weight-average and number-average molecular weights for Polymer 1 was obtained. The weight-average molecular weight for Polymer 1 was 194,831 Daltons, and the number-average molecular weight for Polymer 1 was 25,790 Daltons. The polydispersity index value, Mw/Mn, for Polymer 1 was 7.74.

Polymer 1 was dispersed in an aqueous phase of a water formulation, and the pH of the formulation was adjusted to 2. Adjustment of the pH took place by adding a 10% aqueous solution of sodium hydroxide to the formulation. The formulation was analyzed with dynamic light scattering to determine the polymer particle size distribution at this pH. The average particle size of the polymer was found to be 170 nm, where 66.1% by volume of the particles had an average diameter of 470 nm, and 24% by volume of the particles had an average diameter of 50 microns.

The pH of the formulation was increased to 4.5 by the addition of alkali to the formulation having a pH of 2, and the formulation having the pH of 4.5 was analyzed with dynamic light scattering to determine the polymer particle size distribution at this pH. The average particle size of the polymer was found to be 300 nm, where 95% by volume of the particles had an average diameter of 380 nm.

Example 2—Test with Polymer 1

A test method was developed in which a non-woven fabric is laminated with polymer solution after heating at 100° C. for 15 seconds, then allowed to dry for different time intervals; 15, 30 and 60 seconds. The debonding force is measured separately and independently for each time interval. The 15 seconds measurement is defined as the pick-up adhesion value when the polymer film is still wet, the 30 seconds measurement is the holding power of the semi-dried film for the semi-dried tissue substrate, and finally the 60 seconds measurement is the adhesion force between the dried tissue and dried film when they hit the creping blade; this assumption is based on the drying profile of 0.8 ml of 2.5% polymer solution over a 100° C. hot stainless steel plate.

TABLE 2

Adhesion power of Polymer 1 compared to other polymer-compositions.

| Polymer Composition | Pick-up Adhesion (gf) | Holding Adhesion (gf) | Debonding/ creping Adhesion (gf) |
|---|---|---|---|
| Polymer 1 | 375 | 650 | 1650 |
| Polymer 1 with 0.5% KFLEX DP | 250 | 450 | 1550 |
| Polymer 1 with 0.5% KFLEX 850P | 125 | 1100 | 1100 |
| POVAL 5/88 | 225 | 350 | 1700 |
| BLX 14429 (polyamidoamine Yankee adhesive) | 25 | 125 | 500 |

Example 3—Particle Size Analysis of Polymer 1 in Aqueous Media at Various pHs An aqueous dispersion of Polymer 1 was obtained at pH 2. As the pH was raised from 2 to 4.5, the average particle size increased from 170 to 300 nm as shown Table 3, below. This increase was likely due to the water swelling of the particles by the carboxylic, hydroxyl and amide groups of the polymer. At pH 4.5, 95% of the particle population had an average diameter of 380 nm, and the polydispersity index declined from 0.61 at pH 2 to 0.39 at pH 4.5 due to water swelling.

The pH was further raised to 6, which dramatically decreased the average particle diameter to 80 nm due to conversion from the colloidal particulate state to unfolded, free-flowing, amorphous polymers. The polydispersity index at pH 6 increased to 0.8; this broad polydispersity was attributed to the complete breakdown of condensed particles to unfolded, fully-hydrated polymers. At pH 2, the particles and free PVOH particles are forced to shrink due to increased level of intra molecular attractions, and thus 72% of the volume weighted particles had an average diameter of 29 nm. At pH 4.5, the level of intra-molecular physical attraction, and the level of inter-particulate physical attraction, decreased, which supports the finding that 88% of particulates had an increased average diameter of 500 nm. When the particles are converted into a solution or unfolded at pH 6, 99.8% of the particles had an average diameter of only 6 nm, a result which indicates that this polymer dispersion converted between particulate and free hydrocolloidal molecules.

TABLE 3

Particle size of Polymer 1 at various pHs.

| | | | INTENSITY-WEIGHTED | | | |
|---|---|---|---|---|---|---|
| | CUMULANT RESULTS | | NNLS RESULTS | | | |
| | | | PEAK 1 | | PEAK 2 | |
| SAMPLE ID | Z-AVERAGE (nm) | PDI | PEAK 1 (nm) | WIDTH (nm) | PEAK 2 (nm) | WIDTH (nm) |
| | | | Emulsion 25% Solids | | | |
| Polymer 1 (pH 6) | 79.19 | 0.80 | 549.3 | 414.1 | 44.73 | 24.83 |
| Polymer 1 (pH 4.5) | 300.2 | 0.39 | 378.9 | 213.4 | 4686 | 874.4 |
| Polymer 1 (pH 2) | 170.3 | 0.61 | 468.5 | 372.4 | 46.55 | 20.70 |

The present invention includes the following aspects/embodiments/features in any order and/or in any combination:

1. A grafted polyvinyl alcohol polymer comprising a polyvinyl alcohol main chain and a plurality of side chains grafted to the polyvinyl alcohol main chain,
  wherein one or more of said side chains from the plurality of side chains comprise one or more units selected from: an aliphatic carboxylic acid, an aliphatic amide, a hydroxylated alkyl (meth)acrylate, an alkyl amino (meth)acrylate, or any combinations thereof.
2. The grafted polyvinyl alcohol polymer of any preceding or following embodiment/feature/aspect, wherein the one or more of said side chains from the plurality of side chains comprise: units of the aliphatic carboxylic acid, units of the aliphatic amide, and units of the hydroxylated alkyl (meth)acrylate.
3. The grafted polyvinyl alcohol polymer of any preceding or following embodiment/feature/aspect, wherein the one or more of said side chains from the plurality of side chains comprise units of the aliphatic carboxylic acid.
4. The grafted polyvinyl alcohol polymer of any preceding or following embodiment/feature/aspect, wherein the one or more of said side chains from the plurality of side chains comprise units of the aliphatic amide.
5. The grafted polyvinyl alcohol polymer of any preceding or following embodiment/feature/aspect, wherein the one or more of said side chains from the plurality of side chains comprise units of the hydroxylated alkyl (meth)acrylate.
6. The grafted polyvinyl alcohol polymer of any preceding or following embodiment/feature/aspect, wherein the one or more of said side chains from the plurality of side chains comprise units of the alkyl amino (meth)acrylate.
7. The grafted polyvinyl alcohol polymer of any preceding or following embodiment/feature/aspect, wherein the one or more of said side chains from the plurality of side chains comprise: units of the aliphatic carboxylic acid and units of the aliphatic amide.
8. The grafted polyvinyl alcohol polymer of any preceding or following embodiment/feature/aspect, wherein the one or more of said side chains from the plurality of side chains comprise: units of the aliphatic carboxylic acid and units of the hydroxylated alkyl (meth)acrylate.
9. The grafted polyvinyl alcohol polymer of any preceding or following embodiment/feature/aspect, wherein the one or more of said side chains from the plurality of side chains comprise: units of the aliphatic amide and units of the hydroxylated alkyl (meth)acrylate.
10. The grafted polyvinyl alcohol polymer of any preceding or following embodiment/feature/aspect, wherein the one or more of said side chains from the plurality of side chains comprise: units of the aliphatic amide and units of the alkyl amino (meth)acrylate.
11. The grafted polyvinyl alcohol polymer of any preceding or following embodiment/feature/aspect, wherein said grafted polyvinyl alcohol polymer has a viscosity of less than 500 cP·s when present in an aqueous dispersion having a pH of 3, at a concentration of 22.5 to 25 wt %, at 25° C. and 1 atmosphere.
12. The grafted polyvinyl alcohol polymer of any preceding or following embodiment/feature/aspect, wherein said grafted polyvinyl alcohol polymer has a viscosity of less than 100 cP·s when present in an aqueous solution having a pH of 3, at a concentration of 2.5 to 10 wt %, at 25° C. and 1 atmosphere.
13. The grafted polyvinyl alcohol polymer of any preceding or following embodiment/feature/aspect, wherein said grafted polyvinyl alcohol polymer is capable of being dispersed in an aqueous solution at a concentration of from 10 wt % to 40 wt %.
14. The grafted polyvinyl alcohol polymer of any preceding or following embodiment/feature/aspect, wherein said grafted polyvinyl alcohol polymer is capable of being dispersed in an aqueous solution and forming a stable aqueous dispersion that does not exhibit coagulation or precipitation of the grafted polyvinyl alcohol polymer within a period of at least 6 months at 25° C. and 1 atmosphere of pressure.
15. The grafted polyvinyl alcohol polymer of any preceding or following embodiment/feature/aspect, wherein said grafted polyvinyl alcohol polymer is capable of being in condensed form when present in an aqueous solution having a pH of from about 2 to about 5 or from about 2 to about 3, and is capable of being in semi-condensed form when present in an aqueous solution having a pH of from about 4 to about 5.5, and is capable of being in amorphous form when present in an aqueous solution having a pH of from about 5.5 to about 8.
16. The grafted polyvinyl alcohol polymer of any preceding or following embodiment/feature/aspect, wherein said grafted polyvinyl alcohol polymer has one or more of the following properties:

a) the grafted polyvinyl alcohol polymer is a latex;
b) the grafted polyvinyl alcohol polymer is completely dispersible in water at an amount of from 1 wt % to 25 wt % at a pH of 2 to 3 or a pH of 2 to 5;
c) the grafted polyvinyl alcohol polymer is not an irreversible gel at any pH; and
d) the grafted polyvinyl alcohol polymer is gel-free at a pH of 8.

17. The grafted polyvinyl alcohol polymer of any preceding or following embodiment/feature/aspect, wherein said grafted polyvinyl alcohol polymer has a first glass transition temperature of from −40° C. to 60° C., and a second glass transition temperature of from 70° C. to 90° C.

18. The grafted polyvinyl alcohol polymer of any preceding or following embodiment/feature/aspect, wherein the grafted polyvinyl alcohol polymer has a weight-average molecular weight of from 5,000 Daltons to about 1,500,000 Daltons.

19. The grafted polyvinyl alcohol polymer of any preceding or following embodiment/feature/aspect, wherein the grafted polyvinyl alcohol polymer has a number-average molecular weight of from 1,000 Daltons to about 50,000 Daltons.

20. The grafted polyvinyl alcohol polymer of any preceding or following embodiment/feature/aspect, wherein said grafted polyvinyl alcohol polymer has a polydispersity, Mw/Mn, of at least 1.5.

21. The grafted polyvinyl alcohol polymer of any preceding or following embodiment/feature/aspect, wherein the polyvinyl alcohol main chain, in unreacted form, has a weight-average molecular weight of from about 5,000 Daltons to about 1,500,000 Daltons.

22. The grafted polyvinyl alcohol polymer of any preceding or following embodiment/feature/aspect, wherein the molecular weight distribution is a monomodal, bimodal, or multimodal molecular weight distribution.

23. The grafted polyvinyl alcohol polymer of any preceding or following embodiment/feature/aspect, wherein the polyvinyl alcohol main chain, in unreacted form, has a number-average molecular weight of from about 1,000 Daltons to about 50,000 Daltons.

24. The grafted polyvinyl alcohol polymer of any preceding or following embodiment/feature/aspect, wherein the polyvinyl alcohol main chain, in unreacted form, has a polydispersity, Mw/Mn, of from 2 to 7.

25. The grafted polyvinyl alcohol polymer of any preceding or following embodiment/feature/aspect, wherein the polyvinyl alcohol main chain has a degree of hydrolysis of from about 74 mol % to about 95 mol %.

26. The grafted polyvinyl alcohol polymer of any preceding or following embodiment/feature/aspect,
wherein the aliphatic carboxylic acid is present and comprises at least one of acrylic acid and methacrylic acid,
wherein the aliphatic amide is present and comprises at least one of acrylamide, methacrylamide, dimethyl acrylamide, diethyl acrylamide, dipropyl acrylamide and N-t-butylacrylamide, and
wherein the hydroxylated alkyl (meth)acrylate is present and comprises at least one of 2-hydroxyethyl methacrylate and hydroxy propyl methacrylate.

27. The grafted polyvinyl alcohol polymer of any preceding or following embodiment/feature/aspect,
wherein the alkyl amino (meth)acrylate is present and is or comprises N(3-aminopropyl)-2-propenamide and/or N-(3-aminopropyl) methacrylamide hydrochloride.

28. The grafted polyvinyl alcohol polymer of any preceding or following embodiment/feature/aspect,
wherein the aliphatic carboxylic acid is present and is methacrylic acid,
wherein the aliphatic amide is present and is acrylamide, and
wherein the hydroxylated alkyl (meth)acrylate is present and is 2-hydroxyethyl methacrylate.

29. The grafted polyvinyl alcohol polymer of any preceding or following embodiment/feature/aspect, which includes a structure (I):

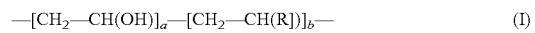

$$—[CH_2—CH(OH)]_a—[CH_2—CH(R)]_b—$$ (I)

wherein a total weight percent of (a) units is from 74% to 95% based on the total weight of the grafted polyvinyl alcohol polymer,
wherein a total weight percent of (b) units is from 5% to 26% based on the total weight of the grafted polyvinyl alcohol polymer,
wherein each R is acetate or a side chain from the plurality of side chains.

30. The grafted polyvinyl alcohol polymer of any preceding or following embodiment/feature/aspect, which includes a structure (II):

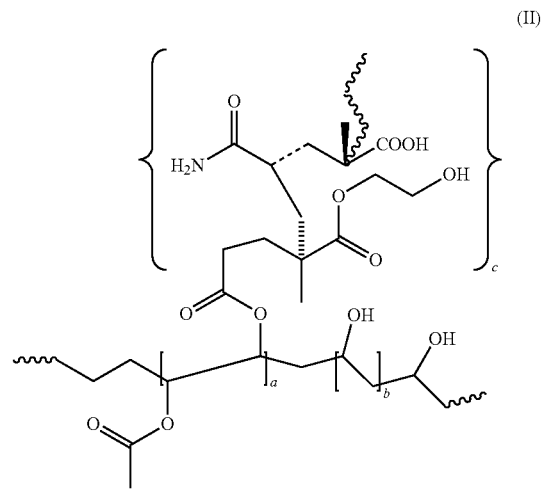

wherein a is from 1 to 10; b is from 35 to 55; c is from 35 to 55, provided that a+b+c=100.

31. A formulation comprising:
an aqueous phase; and
the grafted polyvinyl alcohol polymer of any preceding or following embodiment/feature/aspect.

32. The formulation of any preceding or following embodiment/feature/aspect, wherein said formulation comprises:
100 parts by weight of the aqueous phase; and
from 10 parts by weight to 40 parts by weight of the grafted polyvinyl alcohol polymer, wherein
the grafted polyvinyl alcohol polymer is dispersed in the aqueous phase.

33. The formulation of any preceding or following embodiment/feature/aspect, wherein said formulation is a stable aqueous dispersion that does not exhibit coagulation or precipitation of the grafted polyvinyl alcohol polymer within a period of at least six months.

34. The formulation of any preceding or following embodiment/feature/aspect, wherein said formulation has a pH of from about 2 to about 3, and wherein the grafted polyvinyl alcohol polymer is in condensed form.

35. The formulation of any preceding or following embodiment/feature/aspect, wherein said formulation has a pH of from about 4 to about 5.5, and
   wherein the grafted polyvinyl alcohol polymer is in semi-condensed form.
36. The formulation of any preceding or following embodiment/feature/aspect, wherein said formulation has a pH of from about 5.5 to about 8, and
   wherein the grafted polyvinyl alcohol polymer is in an amorphously-dissolved form.
37. The formulation of any preceding or following embodiment/feature/aspect, wherein said grafted polyvinyl alcohol polymer is soluble in said aqueous phase in an amount of at least 10 g/100 g water.
38. The formulation of any preceding or following embodiment/feature/aspect, wherein said formulation contains less than 1 wt % of surfactant.
39. The formulation of any preceding or following embodiment/feature/aspect, wherein said formulation is surfactant free.
40. A method of making a grafted polyvinyl alcohol polymer of any preceding or following embodiment/feature/aspect, the method comprising:
   polymerizing, via free-radical polymerization, at least one of an aliphatic carboxylic acid, an aliphatic amide, amino alkyl (meth)acrylate, and a hydroxylated alkyl (meth)acrylate in the presence of a free polyvinyl alcohol.
41. A method of making an aqueous solution of a grafted polyvinyl alcohol polymer of any preceding or following embodiment/feature/aspect, the method comprising:
   adding alkali to a dispersion, to thereby increase the pH of the dispersion to be from 4 to 8 and form an aqueous solution of the grafted polyvinyl alcohol polymer, wherein
   the dispersion comprises:
      an aqueous phase; and
      the grafted polyvinyl alcohol polymer, which is dispersed in the aqueous phase, wherein the dispersion has a pH of from 2 to 3 or from 2 to 5 prior to said adding.
42. A process for creping a fiber web, comprising:
   providing a rotating cylindrical dryer, including a dryer surface,
   applying a formulation comprising the grafted polyvinyl alcohol polymer of any preceding or following embodiment/feature/aspect to the dryer surface,
   conveying a fiber web to the dryer surface,
   drying the fiber web on said dryer surface to form a dried fiber web, and
   creping the dried fiber web from the dryer surface.
43. The process of any preceding or following embodiment/feature/aspect, wherein said formulation is a dispersion.
44. The process of any preceding or following embodiment/feature/aspect, wherein said formulation has a pH of from about 4.5 to about 6.
45. The process of any preceding or following embodiment/feature/aspect, further comprising: substantially removing the formulation from the dryer surface of the said creping.
46. The process of any preceding or following embodiment/feature/aspect, further comprising: prior to said substantially removing, raising the pH of said formulation on said dryer surface to a pH above 6.
47. Any product or process of any preceding or following embodiment/feature/aspect of the grafted polyvinyl alcohol polymer, wherein the plurality of side chains is free of vinylic monomers.
48. Any product or process of any preceding or following embodiment/feature/aspect of the grafted polyvinyl alcohol polymer, wherein the plurality of side chains is substantially free of vinylic monomers.
49. Any product or process of any preceding or following embodiment/feature/aspect of the grafted polyvinyl alcohol polymer, wherein the plurality of side chains is exclusively acrylic monomers.

The present invention can include any combination of these various aspects, features, or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

It will be apparent to those skilled in the art that various modifications and variations can be made to the embodiments of the present invention without departing from the spirit or scope of the present invention. Thus, it is intended that the present invention covers other modifications and variations of this invention provided they come within the scope of the appended claims and their equivalents.

What is claimed is:

1. A grafted polyvinyl alcohol polymer comprising a polyvinyl alcohol main chain and a plurality of side chains grafted to the polyvinyl alcohol main chain,
   wherein one or more of said side chains from the plurality of side chains comprise i) units of an aliphatic carboxylic acid or units of an aliphatic amide or both, and ii) units of an amino alkyl (meth)acrylate or units of a hydroxylated alkyl (meth)acrylate, or both, and
   wherein said grafted polyvinyl alcohol polymer has each of the following properties:
   a) the grafted polyvinyl alcohol polymer is a latex;
   b) the grafted polyvinyl alcohol polymer is completely dispersible in water at an amount of from 1 wt % to 25 wt % at a pH of 2 to 5;
   c) the grafted polyvinyl alcohol polymer is not an irreversible gel at any pH;
   d) the grafted polyvinyl alcohol polymer is gel-free at a pH of 8 and
   e) the grafted polyvinyl alcohol polymer has a first glass transition temperature of from −40° C. to 60° C., and a second glass transition temperature of from 70° C. to 90° C.

2. The grafted polyvinyl alcohol polymer of claim 1, wherein the one or more of said side chains from the plurality of side chains comprise: units of the aliphatic carboxylic acid, units of the aliphatic amide, units of the amino alkyl (meth)acrylate, and units of the hydroxylated alkyl (meth)acrylate.

3. The grafted polyvinyl alcohol polymer of claim 1, wherein the one or more of said side chains from the plurality of side chains comprise units of the aliphatic carboxylic acid.

4. The grafted polyvinyl alcohol polymer of claim 1, wherein the one or more of said side chains from the plurality of side chains comprise units of the aliphatic amide.

5. The grafted polyvinyl alcohol polymer of claim 1, wherein the one or more of said side chains from the plurality of side chains comprise units of the hydroxylated alkyl (meth)acrylate.

6. The grafted polyvinyl alcohol polymer of claim 1, wherein the one or more of said side chains from the plurality of side chains comprise: units of the aliphatic carboxylic acid and units of the aliphatic amide.

7. The grafted polyvinyl alcohol polymer of claim 1, wherein the one or more of said side chains from the plurality of side chains comprise: units of the aliphatic carboxylic acid and units of the hydroxylated alkyl (meth)acrylate.

8. The grafted polyvinyl alcohol polymer of claim 1, wherein the one or more of said side chains from the plurality of side chains comprise: units of the aliphatic amide and units of the hydroxylated alkyl (meth)acrylate.

9. The grafted polyvinyl alcohol polymer of claim 1, wherein a) said grafted polyvinyl alcohol polymer has a viscosity of less than 500 cP·s when present in an aqueous dispersion having a pH of 3, at a concentration of 22.5 to 25 wt %, at 25° C. and 1 atmosphere or b) said grafted polyvinyl alcohol polymer has a viscosity of less than 100 cPs when present in an aqueous solution having a pH of 3, at a concentration of 2.5 to 10 wt %, at 25° C. and 1 atmosphere or c) said grafted polyvinyl alcohol polymer is capable of being dispersed in an aqueous solution at a concentration of from 10 wt % to 40 wt %.

10. The grafted polyvinyl alcohol polymer of claim 1, wherein said grafted polyvinyl alcohol polymer is capable of being in condensed form when present in an aqueous solution having a pH of from about 2 to about 5, and is capable of being in semi-condensed form when present in an aqueous solution having a pH of from about 4 to about 5.5, and is capable of being in amorphous form when present in an aqueous solution having a pH of from about 5.5 to about 8.

11. The grafted polyvinyl alcohol polymer of claim 1, wherein a) the grafted polyvinyl alcohol polymer has a weight-average molecular weight of from 5,000 Daltons to about 1,500,000 Daltons or b) the grafted polyvinyl alcohol polymer has a number-average molecular weight of from 1,000 Daltons to about 50,000 Daltons, or c) said grafted polyvinyl alcohol polymer has a polydispersity, Mw/Mn, of at least 1.5 .

12. The grafted polyvinyl alcohol polymer of claim 1, wherein a) the polyvinyl alcohol main chain, in unreacted form, has a weight-average molecular weight of from about 5,000 Daltons to about 1,500,000 Daltons or b) the polyvinyl alcohol main chain, in unreacted form, has a number-average molecular weight of from about 1,000 Daltons to about 50,000 Daltons or c) the polyvinyl alcohol main chain, in unreacted form, has a polydispersity, Mw/Mn, of from 2 to 7 or d) the polyvinyl alcohol main chain has a degree of hydrolysis of from about 74 mol % to about 95 mol %.

13. The grafted polyvinyl alcohol polymer of claim 1, wherein the aliphatic carboxylic acid is present and comprises at least one of acrylic acid and methacrylic acid, wherein the aliphatic amide is present and comprises at least one of acrylamide, methacrylamide, dimethyl acrylamide, diethyl acrylamide, dipropyl acrylamide and N-t-butylacrylamide, and wherein the hydroxylated alkyl (meth)acrylate is present and comprises at least one of 2-hydroxyethyl methacrylate and hydroxy propyl methacrylate.

14. The grafted polyvinyl alcohol polymer of claim 1, which includes a structure (I):

—[CH$_2$—CH(OH)]$_a$—[CH$_2$—CH(R)]$_b$—      (I)

wherein a total weight percent of (a) units is from 74% to 95% based on the total weight of the grafted polyvinyl alcohol polymer, wherein a total weight percent of (b) units is from 5% to 26% based on the total weight of the grafted polyvinyl alcohol polymer, wherein each R is acetate or a side chain from the plurality of side chains.

15. A formulation comprising:
an aqueous phase; and
the grafted polyvinyl alcohol polymer of claim 1.

16. The formulation of claim 15, wherein said formulation comprises:
100 parts by weight of the aqueous phase; and
from 10 parts by weight to 40 parts by weight of the grafted polyvinyl alcohol polymer, wherein
the grafted polyvinyl alcohol polymer is dispersed in the aqueous phase.

17. The formulation of claim 15, wherein a) said formulation has a pH of from about 2 to about 5, and wherein the grafted polyvinyl alcohol polymer is in condensed form or b) said formulation has a pH of from about 4 to about 5.5, and wherein the grafted polyvinyl alcohol polymer is in semi-condensed form or c) said formulation has a pH of from about 5.5 to about 8, and wherein the grafted polyvinyl alcohol polymer is in an amorphously-dissolved form.

18. The formulation of claim 15, wherein said formulation contains less than 1 wt % of surfactant.

19. A method of making a grafted polyvinyl alcohol polymer of claim 1, the method comprising:
polymerizing, via free-radical polymerization, at least one of an aliphatic carboxylic acid, an aliphatic amide, an amino alkyl (meth)acrylate and a hydroxylated alkyl (meth)acrylate in the presence of a free polyvinyl alcohol.

20. A method of making an aqueous solution of a grafted polyvinyl alcohol polymer of claim 1, the method comprising:
adding alkali to a dispersion, to thereby increase the pH of the dispersion to be from 4 to 8 and form an aqueous solution of the grafted polyvinyl alcohol polymer, wherein
the dispersion comprises:
an aqueous phase; and
the grafted polyvinyl alcohol polymer, which is dispersed in the aqueous phase, wherein the dispersion has a pH of from 2 to 5 prior to said adding.

21. A process for creping a fiber web, comprising:
providing a rotating cylindrical dryer, including a dryer surface,
applying a formulation comprising the grafted polyvinyl alcohol polymer of claim 1 to the dryer surface,
conveying a fiber web to the dryer surface,
drying the fiber web on said dryer surface to form a dried fiber web, and
creping the dried fiber web from the dryer surface.

22. The process of claim 21, wherein said formulation has a pH of from about 4.5 to about 6.

23. The process of claim 21, further comprising:
substantially removing the formulation from the dryer surface of the said creping and prior to said substantially removing, raising the pH of said formulation on said dryer surface to a pH above 6.

24. The grafted polyvinyl alcohol polymer of claim 1, wherein a) said plurality of side chains is free of vinylic monomers or b) said plurality of side chains is substantially free of vinylic monomers or c) wherein said plurality of side chains is exclusively acrylic monomers.

25. The grafted polyvinyl alcohol polymer of claim 1, wherein, by a weight percent based on the weight of the grafted polyvinyl alcohol polymer, the units of the aliphatic carboxylic acid or the units of the aliphatic amide or both are present at a total weight percent that is lower than total weight percent of the units of the amino alkyl (meth)acrylate or the units of the hydroxylated alkyl (meth)acrylate, or both.

* * * * *